United States Patent Office 2,918,543
Patented Dec. 22, 1959

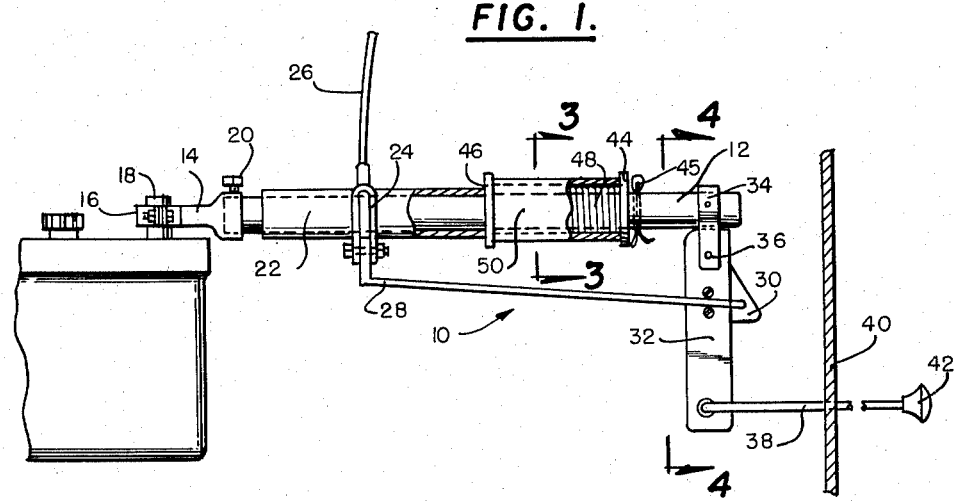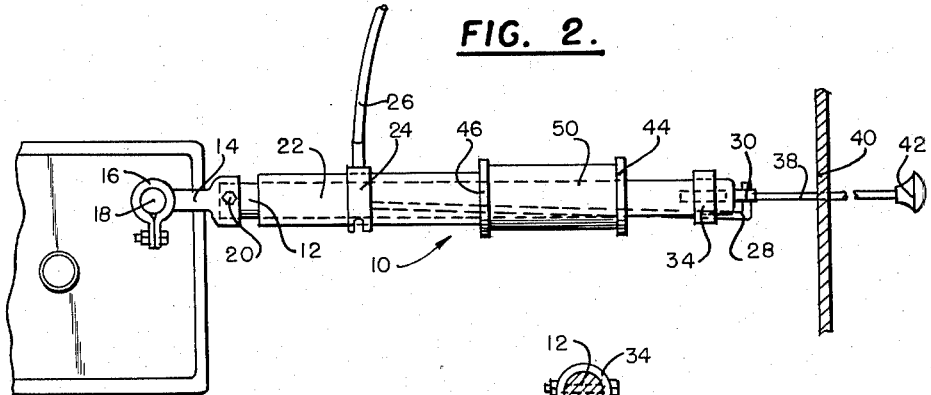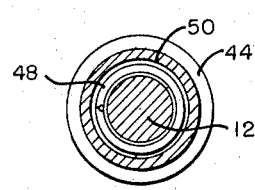

2,918,543

AUTOMOBILE SAFETY DEVICE

Stanley W. Vingin, Verona, Pa.

Application December 10, 1958, Serial No. 779,464

4 Claims. (Cl. 200—51)

This invention relates to automotive vehicles and more particularly to a safety device therefor.

It is an object of the present invention to provide quick acting circuit breaking apparatus for disconnecting the electric storage battery from the electrical supply circuit of the vehicle in times of emergency.

Another object of the present invention is to provide a manually actuated circuit breaking switch for automotive vehicles that will enable the vehicle to be completely deenergized whenever desired to prevent tampering, theft, and accidents, and to further provide means for quickly and safely disconnecting the vehicle battery should a fire result from faulty wiring.

Other objects of the invention are to provide an automobile safety device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view, with parts broken away, of a safety device made in accordance with the present invention in operative use;

Figure 2 is a top plan view of the apparatus shown in Figure 1;

Figure 3 is an enlarged transverse cross sectional view taken along line 3—3 of Figure 1; and Figure 4 is an enlarged transverse cross sectional view taken along line 4—4 of Figure 1.

Referring now more in detail to the drawing, an automobile safety device 10 made in accordance with the present invention is shown to include a mounting rod 12 preferably constructed of a dielectric material. An electrically conductive clamp 14 having a ring portion 16 for receiving the terminal 18 of a vehicle battery therethrough, is releasably secured upon the end of the mounting rod 12, such as by a set screw 20. An electric contact 22 in the form of an elongated tubular sleeve 22 is slidably supported upon the mounting rod 12 for reciprocating longitudinal movement relative thereto. A clevis 24 secured to the mid section of the sleeve 22 is electrically connected to a conductor 26 which is in the vehicle electrical supply system. In addition, an operating rod 28 is connected to the clevis 24 at one end and at the opposite end to a mounting 30 carried intermediate the ends of a pivotally mounted lever 32. This lever 32 is pivotally mounted, by means of a pivot pin 36, upon a clamp 34 secured to the opposite end of the mounting rod 12.

The outer end of the lever 32 extends adjacent to the firewall or dashboard wall 40 of the vehicle, through which a manually actuated control rod 38 extends. One end of this control rod 38 is connected to the lever 32, while the opposite end thereof includes a knob 42 for effecting actuation thereof.

A pair of washers 44, 46 are slidably supported upon a mounting rod 12, between which a compression whirl spring 48 is supported in encircling engagement with the rod 12. A cotter pin 45 serves as a stop to limit outward movement of one washer 44, while the other washer 46 is in abutting engagement with the outer end of the contact sleeve 22. The spring 48 serves to urge the contact 22 toward circuit closing engagement with the conductor clamp 14, so as to normally maintain an electric circuit through the clamp 14, sleeve 22, and electrical circuit conductor 26. This spring is enclosed by a fabric casing 50 to prevent the entry of foreign matter into the interior thereof and to further prevent short circuits in the system.

The operation of this device will now be readily understood. With the parts in proper assembled relationship in the manner illustrated in Figures 1 and 2 of the drawing, the spring 48 normally maintains the sleeve 22 and conductor clamp 14 in circuit closing engagement. However, in response to an outward pull upon the knob 42 of the control lever 38, the control rod 28 is withdrawn so as to move the sleeve 22 out of contact with the conductor clamp 14, thus opening the circuit through the vehicle supply system. The switch may be so opened whenever desired such as when parking the vehicle within a garage overnight, when parking the vehicle on a street to prevent theft or tampering, or when a fire may be caused within the vehicle, such as due to faulty wiring or short circuits. At other times, the unit is normally moved into the circuit closing position so as to allow for the proper operation and use of the vehicle in a conventional manner.

While various changes may be made in the detail construction, it shall be understood that such changes shall be within the spirit and scope of the present invention as defined by the appended claims.

What I claim as new and desire to protect by Letters Patent of the United States is:

1. A safety device for automotive vehicles comprising, in combination, a dielectric mounting rod, an electrically conductive clamp secured to one end of said mounting rod for attachment to a battery terminal, an electrical contact consisting of a sleeve slidably supported upon said dielectric mounting rod and connected in the electrical supply circuit of the vehicle, and manually controlled means for selectively moving said contact into and out of circuit closing engagement with said clamp.

2. A safety device for automotive vehicles comprising, in combination, a dielectric mounting rod, an electrically conductive clamp secured to one end of said mounting rod for attachment to a battery terminal, an electrical contact consisting of a sleeve slidably supported upon said dielectric mounting rod and connected in the electrical supply circuit of the vehicle, a lever pivotally supported upon said dielectric mounting rod, a control rod connected between a central portion of said lever and said electrical contact sleeve, and a manually operated rod connected to an outer end of said lever for selectively effecting pivotal movement thereof to adjust the position of said sleeve upon said mounting rod.

3. A safety device for automotive vehicles comprising, in combination, a dielectric mounting rod, an electrically conductive clamp secured to one end of said mounting rod for attachment to a battery terminal, an electrical contact consisting of a sleeve slidably supported upon said dielectric mounting rod and connected in the electrical supply circuit of the vehicle, a lever pivotally supported upon said dielectric mounting rod, a control rod connected between a central portion of said lever and said electrical contact sleeve, and a manually operated rod connected to an outer end of said lever for selectively effecting pivotal movement thereof to adjust the position of said sleeve upon said mounting rod, and spring means normally urging said sleeve toward circuit closing engagement with said electrically conductive clamp.

4. A safety device for automotive vehicles comprising, in combination, a dielectric mounting rod, an electrically conductive clamp secured to one end of said mounting rod for attachment to a battery terminal, an electrical contact consisting of a sleeve slidably supported upon said dielectric mounting rod and connected in the electrical supply circuit of the vehicle, a lever pivotally supported upon said dielectric mounting rod, a control rod connected between a central portion of said lever and said electrical contact sleeve, and a manually operated rod connected to an outer end of said lever for selectively effecting pivotal movement thereof to adjust the position of said sleeve upon said mounting rod, a compression coil spring encircling said mounting rod, a stop limiting movement of one end of said spring, and the opposite end of said spring being in pressure engagement with an adjacent end of said sleeve.

References Cited in the file of this patent

UNITED STATES PATENTS

| | | |
|---|---|---|
| 1,615,106 | Bethea | Jan. 18, 1927 |
| 2,458,930 | Crooke | Jan. 11, 1949 |
| 2,563,335 | Istrati et al. | Aug. 7, 1951 |
| 2,803,725 | Ott | Aug. 20, 1957 |
| 2,860,213 | McNamara | Nov. 11, 1958 |